Aug. 27, 1940.                R. LANDOLT                    2,212,665
                           DOUBLE-ACTING ENGINE
                           Filed Nov. 15, 1938

INVENTOR
Rodolphe Landolt
BY
Pennie, Davis, Marvin & Edmonds
ATTORNEYS

Patented Aug. 27, 1940

2,212,665

UNITED STATES PATENT OFFICE 2,212,665

DOUBLE-ACTING ENGINE

Rodolphe Landolt, Zurich, Switzerland, assignor to Sulzer Frères, Société Anonyme, Winterthur, Switzerland Application November 15, 1938, Serial No. 240,550
In Switzerland November 15, 1937

1 Claim. (Cl. 121—1)

This invention relates to double-acting engines of the type in which the piston is mounted upon a guided piston rod and has for its object the provision of certain improvements in engines of that character. The invention aims to provide means to compensate for the unequal expansion of different sides of the engine cylinder to keep the cylinder axis rectilinear when the engine is in operation, and particularly to correct the unequal expansion of the cylinder caused by the flow of relatively high temperature gas or steam at one side of the cylinder and the flow of relatively low temperature gas or steam at another side of the cylinder. In maintaining the cylinder axis rectilinear during operation, the cylinder may be so constructed and arranged that the cylinder axis assumes a straight position during operation, the inlet and outlet valves may be positioned to cause uniform expansion, or those portions of the cylinder that would ordinarily be at the lowest temperature during operation of the engine may be heated externally. The improvements in accordance with the invention are applicable to various kinds of double-acting engines, for example, steam, gas, or Diesel engines.

Figure 1:
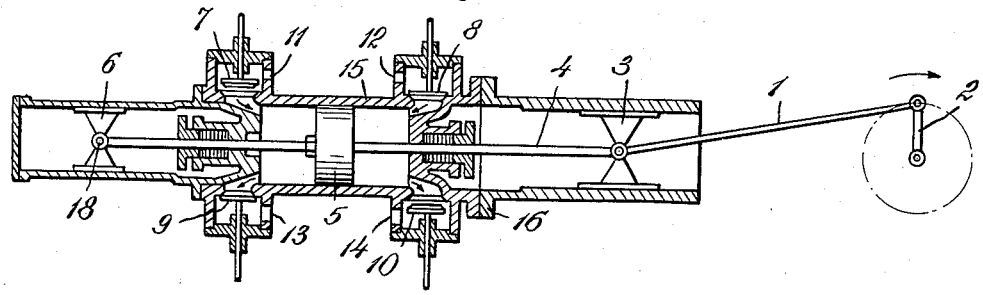
Fig. 1 is a longitudinal sectional view of a double-acting steam-engine embodying the invention.

In the double-acting steam-engine illustrated in Fig. 1, the connecting rod 1 is coupled to the drive crank 2, the cross head 3 and the piston rod 4 in the usual way. The piston rod 4 carries the piston 5 and is guided by the slides 6 at the rear end of the engine and the cross head 3. The inlet valves are designated by 7 and 8, the outlet valves by 9 and 10, the steam inlet ports by 11 and 12, and the steam outlet ports by 13 and 14. The cylinder 15 is suitably connected as by bolts (not shown) to the flange 16 of the engine frame.

Figure 2:
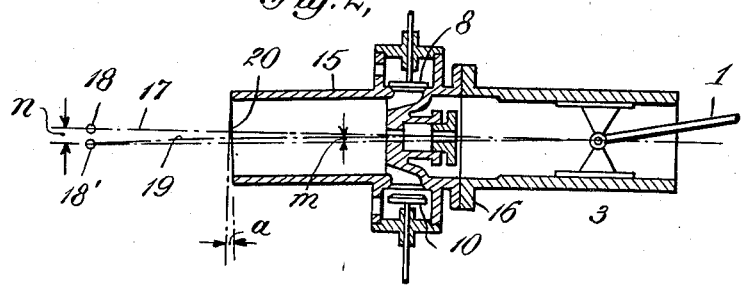
Fig. 2 is a fragmentary view of the apparatus of Fig. 1 diagrammatically illustrating the movement of the cylinder axis.
Figure 3:
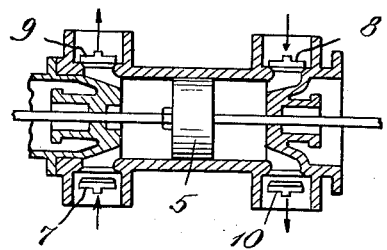
Fig. 3 is a longitudinal sectional view of a double-acting engine with a valve arrangement embodying the invention.

In the arrangement of valves of Fig. 1 the high temperature steam or super-heated steam is admitted to one side of the cylinder through the valves 7 and 8 and relatively lower temperature steam is discharged from the cylinder through the exhaust valves 9 and 10. This causes that side of the cylinder adjacent the inlet valves to be considerably hotter than the side adjacent the exhaust valves and the cylinder to assume a bent form due to the unequal expansion or deformation of the differently heated sides. This unequal heating with the resulting bending of the cylinder is diagrammatically illustrated on an exaggerated scale in Fig. 2. When the cylinder is cold, its axis is represented by the horizontal or longitudinal axis 17. When the walls of the cylinder 15 are unequally heated, the rear edge 20 becomes inclined to the vertical as measured by angle $a$. A given point on the axis 17, for example, a point on the slide 6, will move downwardly after the cylinder has been unequally heated through the distance $n$ to point 18', a point on a sloped line 19, which becomes the bent cylinder axis. The longitudinal center of the piston 5 is accordingly displaced from the axis 17 to the axis 19 by an amount $m$. This causes the piston rings, due to the bent path of the piston, to travel up and down in their grooves. Thus, the chambers formed in the cylinder on each side of the piston are each provided with an inlet and an outlet valve positioned opposite one another and so disposed in these chambers that the inlet valves of the two chambers are on substantially opposite sides of the cylinder axis and that the exhaust valves of the two chambers are on substantially opposite sides of the cylinder axis. Accordingly, steam or gas enters the two chambers on opposite sides of the cylinder axis in the two separate chambers and leaves these chambers on opposite sides of this axis, respectively.

I claim:

A double-acting internal combustion or steam engine which comprises a cylinder, a piston adapted to move along the axis of the cylinder and to divide the cylinder into two chambers, and an inlet valve and an exhaust valve positioned opposite one another in each chamber, the inlet and exhaust valves being so disposed in said chambers that the inlet valves of the two chambers are on substantially opposite sides of the cylinder axis and that the exhaust valves of the two chambers are on substantially opposite sides of the cylinder axis.

RODOLPHE LANDOLT.